US007067562B2

(12) United States Patent
Espinoza et al.

(10) Patent No.: US 7,067,562 B2
(45) Date of Patent: Jun. 27, 2006

(54) IRON-BASED FISCHER-TROPSCH CATALYSTS AND METHODS OF MAKING AND USING

(75) Inventors: Rafael L. Espinoza, Ponca City, OK (US); Kandaswamy Jothimurugesan, Ponca City, OK (US); Ajoy P. Raje, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 277 days.

(21) Appl. No.: 10/324,419

(22) Filed: Dec. 20, 2002

(65) Prior Publication Data

US 2004/0122115 A1 Jun. 24, 2004

(51) Int. Cl.
*C07C 27/00* (2006.01)

(52) U.S. Cl. ...................... 518/721; 713/715; 713/717; 713/718; 713/719

(58) Field of Classification Search ................ 518/713, 518/715, 717, 718, 719, 721
See application file for complete search history.

(56) References Cited

U.S. PATENT DOCUMENTS

| | | | | |
|---|---|---|---|---|
| 3,752,774 A | | 8/1973 | Stiles | 252/462 |
| 4,199,523 A | * | 4/1980 | Rottig | 518/706 |
| 4,532,229 A | | 7/1985 | Fiato et al. | 502/330 |
| 4,677,084 A | | 6/1987 | Bergna | 502/8 |
| 4,906,671 A | | 3/1990 | Haag et al. | |
| 5,039,648 A | | 8/1991 | Horn | 502/260 |
| 5,118,715 A | | 6/1992 | Iglesia et al. | 518/713 |
| 5,227,407 A | | 7/1993 | Kim | 518/700 |
| 5,277,407 A | | 1/1994 | Mayne et al. | 254/369 |
| 5,714,657 A | | 2/1998 | deVries | |
| 5,879,645 A | | 3/1999 | Park et al. | |
| 6,107,238 A | | 8/2000 | Contractor et al. | 502/247 |
| 6,130,184 A | | 10/2000 | Geerlings et al. | 502/350 |
| 6,262,132 B1 | | 7/2001 | Singleton et al. | 518/715 |
| 6,277,895 B1 | | 8/2001 | Zhou et al. | 518/715 |
| 6,362,128 B1 | | 3/2002 | Schwartz | 502/209 |
| 6,362,239 B1 | | 3/2002 | Buess et al. | 518/715 |
| 6,403,660 B1 | | 6/2002 | Espinoza et al. | 518/700 |
| 6,537,945 B1 | | 3/2003 | Singleton et al. | 502/327 |

FOREIGN PATENT DOCUMENTS

| | | |
|---|---|---|
| EP | 1 308 442 | 5/2003 |
| WO | WO 01/28963 A1 | 4/2001 |

OTHER PUBLICATIONS

Database CAPLUS on STN, Chemical Abstract, (Columbus OH, USA) CA: 127:222697, Srinivasan et al. 'Scanning Electron Microscopy of Copercipitated iron oxide catalysts', Petroleum Science and Technology (1997), 15 (7 &8), 579-594; (see abstract).

PCT Search Report for Appln. No. PCT/US03/39966 dated Jul. 16, 2004 (3 p.).

Jothimurugesan, *Attrition Resistant Catalysts for Slurry-Phase Fischer-Tropsch Process*, Nov. 1999 (pp. 31).

Hein M. Pham et al.; "Improving the attrition resistance of slurry phase heterogeneous catalysts"; Powder Technology vol. 110 (2000), pp. 196-203.

Hien N. Pham; "The synthesis of attrition resistant slurry phase iron Fischer-Tropsch catalysts"; Catalysis Today, vol. 58 (2000); pp. 233-240.

"*Iron Catalysts*," edited by Paul H. Emmett, et al., Hydrocarbon Synthesis, Hydrogenation and Cyclization, Catalysis, vol. IV, pp. 119-133, 1956.

"*Binder/Support Effects on the Activity and Selectivity of Iron Catalysts in the Fischer-Tropsch Synthesis*," by Dragomir B. Bukur et al, Ind. Eng. Chem. Res., vol. 29, pp. 1588-1599, 1990.

"*Promoter Effects on Precipitated Iron Catalyst for Fischer-Tropsch Synthesis*," Dragomir Bukur et al. Ind. Eng. Chem. Res., vol. 29, pp. 194-204, 1990.

"*Iron-based Catalysts for Slurry-phase Fischer-Tropsch Process: Technology Review*," V.U.S. Rao et al., Fuel Processing Technology, vol. 30, pp. 83-107, 1992.

"*Advances in Low Temperature Fischer-Tropsch Synthesis*," B. Jager et al., Catalysis Today, vol. 23, pp. 17-28, 1995.

"*Effect of Silica on Iron-based Fischer-Tropsch Catalysts*," K. Jothimurugesan et al., Natural Gas Conversion V, Studies in Surface Science and Catalysis, vol. 119, pp. 215-220, 1998.

"*Pretreatment Effect Studies With a Precipitated Iron Fischer-Tropsch Catalyst in a Slurry Reactor*," Dragomir B. Bukur et al., Applied Catalysis A: General, vol. 186, pp. 255-275, 1999.

"*Highly Active and Stable Iron Fischer-Tropsch Catalyst for Synthesis Gas Conversion to Liquid Fuels*," Dragomir B. Bukur et al., Ind. Eng. Chem. Res. vol. 38, pp. 3270-3275, 1999.

(Continued)

*Primary Examiner*—J. Parsa
(74) *Attorney, Agent, or Firm*—Conley Rose P.C.

(57) ABSTRACT

The present invention presents an iron-based Fischer-Tropsch catalyst having a low water-gas shift activity and high selectivity and productivity toward a hydrocarbon wax wherein said catalyst comprises iron; silver; sodium, lithium, potassium, rubidium and/or cesium; optionally, calcium, magnesium, boron, and/or aluminum; and a silica structural promoter. The present invention further presents a method of making a precipitated iron-based Fischer-Tropsch catalyst. The present invention still further presents a process for producing hydrocarbons using the iron-based, precipitated Fischer-Tropsch catalyst of the present invention.

126 Claims, No Drawings

OTHER PUBLICATIONS

"*Low Temperature Fischer-Tropsch Synthesis From a Sasol Perspective*," R.L. Espinoza et al., Applied Catalysis A: General, vol. 186, pp. 13-26, 1999.

"*Development of Fe Fischer-Tropsch Catalysts With High Attrition Resistance, Activity, and Selectivity*," K. Jothimurugesan et al., Catalysis Today, vol. 58, pp. 335-344, 2000 (prepare for presentation at the 1999 AIChE Spring National Meeting).

"*Development of Fe Fischer-Tropsch Catalysts for Slurry Bubble Column Reactors*," K. Jothimurugesan et al., Symposium on Syngas Conversion to Fuels and Chemicals Presented Before the Division of Petroleum Chemistry, Inc. 217$^{th}$ National Meeting, American Chemical Society, Anaheim, CA., pp. 111-114, 1999.

"*Development of Fe Fischer-Tropsch Catalysts for Slurry Bubble Column Reactors*," K. Jothimurugesan et al., Catalysis Today, vol. 58, pp. 335-344, 2000.

"*Spray-dried Iron Fischer-Tropsch Catalysts. I. Effect of Structure on the Attrition Resistance of the Catalysts in the Calcined State*," Rong Zhao et al., End. Eng. Chem. Res., vol. 40, pp. 1055-1075, 2001.

"*Preparation of Attrition-resistance Spray-dried Fe Fischer-Tropsch Catalysts Using Precipitated $SiO_2$*," Kandis Sudsakorn et al., End. Eng. Chem. Res., vol. 40, pp. 4778-4784, 2001.

"*Attrition Resistance of Spray-dried Iron F-T Catalysts: Effect of Activation Conditions*," Rong Zhao et al., Catalysis Today, vol. 71, pp. 319-326, 2002.

"*Comparison of Attrition Test Methods: ASTM Standard Fluidized Bed vs Jet Cup*," Rong Zhao et al., End. Eng. Chem. Res., vol. 39, pp. 1155-1158, 2000.

Wachs et al., *Characterization of Fe, Fe-Cu, And Fe-Ag Fischer-Tropsch Catalysts*, Applied Catalysis, 12 (1984) 201-217.

Cornils et al., *Catalyst Development for Selective Syntheses via the Fischer-Tropsch Process*, pp. 23-34.

* cited by examiner

IRON-BASED FISCHER-TROPSCH CATALYSTS AND METHODS OF MAKING AND USING

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to precipitated iron-based Fischer-Tropsch catalysts. In one aspect, the present invention further relates to methods of making precipitated Fischer-Tropsch catalysts. In another aspect, the present invention relates to a process for making hydrocarbons comprising contacting a reactant gas mixture comprising carbon monoxide and hydrogen with a precipitated iron-based Fischer-Tropsch catalyst under suitable conditions and in a suitable reactor.

BACKGROUND OF THE INVENTION

Technologies for converting natural gas to liquid fuels may begin with the partial oxidation of hydrocarbonaceous (e.g. methane) or carbonaceous (e.g. coal) materials to a gaseous mixture comprising carbon monoxide and hydrogen, commonly known as synthesis gas, or syngas. An ensuing catalytic process commonly known as the Fischer-Tropsch reaction transforms synthesis gas to a product mixture comprising hydrocarbons. The general chemistry of the Fischer-Tropsch reactions is as follows:

$$nCO+(2n+1)H_2 \rightarrow C_nH_{2n+2}+nH_2O \quad (1)$$

$$CO+H_2O \rightarrow CO_2+H_2 \quad (2)$$

$$2nCO+(n+1)H_2 \rightarrow C_nH_{2n+2}+nCO_2 \quad (3)$$

One competing reaction may be the water-gas shift reaction, equation (2), in which at least a portion of the carbon monoxide is consumed in a reaction with at least a portion of the water generated from equation (1), above, to form carbon dioxide ($CO_2$) and hydrogen ($H_2$). The net effect is the consumption of at least some of the water produced in equation (1) and an alteration in the $H_2$:CO ratio.

Catalysts used in the Fischer-Tropsch process vary in composition based upon the product mixture desired and reaction conditions employed but commonly comprise at least one catalytic metal selected from Group VIIIA, preferably Co, Ru, Fe or Ni (according to the Previous IUPAC Form of the Periodic Table of the Elements, as depicted in, for example, the CRC Handbook of Chemistry and Physics, 82$^{nd}$ Edition, 2001–2002, the standard used herein for reference to all element group numbers); optionally, at least one promoter selected from Groups IIIA, IVA, VA, VIA, VITA, and/or VIIIA; optionally, at least one promoter selected from Group IB; and optionally, a structural promoter. The Fischer-Tropsch catalyst may or may not comprise an inorganic refractory support.

The catalytic metal used can influence the nature and composition of the mixture of products and by-products formed. For example, it is well known that iron-based Fischer-Tropsch catalysts have high water gas shift activity and tend to favor reaction (3). By contrast, reactors employing cobalt-based Fischer-Tropsch catalysts tend to favor reaction (1). Fischer-Tropsch reactors utilizing a cobalt-based catalyst can generate significant amounts of water due to the relatively low water gas shift activity of cobalt catalysts. It is known, for example, that the high-temperature, high-pressure steam, typically generated within Fischer-Tropsch reactors employing cobalt-based catalysts can degrade and disintegrate catalyst support particles, causing cobalt to dislodge from the support particles and permitting for the appearance of cobalt subparticles in the product stream. The formation of subparticles that are in the submicron range in a product stream has multiple undesirable repercussions: 1) purification and complete removal of subparticles from the product stream tends to become quite difficult; 2) a reduced lifetime of the catalyst; 3) regeneration of recovered cobalt catalyst tends to be severely hindered; and 4) the loss of costly cobalt metal can represent a significant loss of revenue.

By contrast, iron-based Fischer-Tropsch catalysts have features that make their use potentially attractive in Fischer-Tropsch reactors: iron is considerably less expensive than cobalt; and iron catalysts have inherently high activity in Fischer-Tropsch synthesis. However, its high water-gas shift (WGS) activity makes it a preferred catalyst for Fischer-Tropsch syntheses employing coal-derived syngas ($H_2$:CO 0.5–0.7). Such water-gas shift (WGS) capability enables iron Fischer-Tropsch catalysts to process low $H_2$/CO ratio syngas without an external shift reaction step. Cobalt-based catalysts are preferred in Fischer-Tropsch reactors utilizing natural gas-derived syngas ($H_2$:CO 1.6–2.2). Moreover, iron-based catalysts within the art of Fischer-Tropsch synthesis have been used to make $C_2$–$C_5$ olefins and, less frequently, liquid and waxy paraffinic hydrocarbons. Catalytic compositions for iron-based FT catalysts used to produce $C_2$–$C_5$ olefins, important as chemical precursors for the synthesis of a variety of chemical and petrochemical products, may comprise, for example, a skeletal iron catalyst; for use particularly in slurry phase synthesis processes, as disclosed in U.S. Pat. No. 6,277,895 B1, incorporated herein by reference.

Methods of making iron-based Fischer-Tropsch catalysts are well known to those in the art and may include fusion or precipitation. Preparation and activation of precipitated iron catalysts typically consists of precipitating iron hydroxides and oxides from an aqueous solution; washing, drying and calcining the precipitate; and pretreating the catalyst prior to carrying out the Fischer-Tropsch synthesis reaction. Precipitated iron catalysts having a high support content tend to provide liquid products of high viscosity in slurry-phase reactors; a decidedly undesirable artifact as gas distribution in the slurry is increasingly hindered with increasing viscosity. However, improvements in catalyst attrition resistance can be realized through the use of supported iron catalysts though these catalysts tend to be less active.

Fused iron catalysts are typically prepared by adding promoters to the melted oxide at high temperature. Solid chunks are obtained from the cooled mixture then ground and sized. The specific catalytic activity of fused iron catalysts is generally lower than that of precipitated iron catalysts. Indeed, it has been measured in stirred-tank reactors as half that of precipitated iron catalysts (See Fuel Processing Technology, 1992, Vol. 30, pp. 83–107).

Iron-based Fischer-Tropsch catalysts may be spray-dried and there is some evidence that this can positively affect the catalyst attrition resistance in the catalysts so made. The physical strength of iron Fischer-Tropsch catalysts has recently been improved through spray drying without compromising activity (See for example *Ind. Eng. Chem. Res.* 2001, vol. 40, pp. 1065–1075 and references cited therein).

Iron-based catalysts may contain at least one, more typically two, promoter elements to assist in CO adsorption and/or iron reduction. With respect to precipitated iron catalysts, potassium is added as a promoter to increase catalytic activity and yield products with higher molecular weight. The effects of potassium on the behavior of iron catalysts may be summarized as follows: (1) a higher $\alpha$ value, resulting in an increase in the average molecular weight of hydrocarbon products; (2) an increased olefin/paraffin ratio in the hydrocarbon product; (3) an increased water gas shift activity; (4) an increased catalyst deactivation rate; and (5) an increased Fischer-Tropsch activity at optimized potassium concentrations.

A copper promoter is typically introduced into iron-based Fischer-Tropsch catalysts to facilitate the reduction of the iron. Copper tends to be more effective than potassium in increasing the rate of the Fischer-Tropsch reaction but tends to attenuate water-gas shift activity. Copper facilitates the reduction of iron and thus decreases the time required to achieve the steady state in FT synthesis. For example, U.S. Pat. No. 5,118,715 relates to pelletized unsupported single phase iron manganese spinels which are dual promoted with both copper and a Group IA or IIA metal useful for selective synthesis of $C_{5+}$ hydrocarbons from mixtures of CO and $H_2$ in a fixed-bed process.

A structural promoter or binder may be added to an iron catalyst to provide a large surface area for the formation and stabilization of small metal crystallites. For example, silica is sometimes added as a binder to precipitated iron catalysts, especially for those used in fixed-bed reactors; however, its usefulness in slurry bubble-column reactors has not yet been proven. The presence of silica in an iron-based Fischer-Tropsch catalyst may evince any one or more of the following manifestations: 1) A reduction in the concentration of iron in the catalyst requiring the use of greater amounts of catalytic solid which in turn hinders mass transfer; 2) An increase in the concentration of active metal sites through the maintenance of high metal dispersions; 3) An improvement in the aging characteristics of the catalyst.

Iron-based Fischer-Tropsch catalysts may be used in fixed bed or slurry bubble column reactors. Slurry processing provides the ability to more readily remove the heat of reaction, minimizing temperature rise across the reactor and eliminating localized hot spots. As a result of the improved temperature control, yield losses to methane are reduced and catalyst deactivation due to coking is decreased.

To date no one has adequately surmounted the problem of using iron-based Fischer-Tropsch catalysts possessing very low water gas shift activity, such that the carbon dioxide ($CO_2$) selectivity is less than about 18 mol % $CO_2$, while maintaining good CO conversion values, low selectivity for methane and high selectivity and productivity for a hydrocarbon wax product.

SUMMARY OF THE INVENTION

The present invention presents a Fischer-Tropsch catalyst comprising iron; silver; optionally, at least one selected from the group consisting of manganese, zinc and the combination thereof, at least one first promoter selected from the group consisting of sodium, lithium, potassium, rubidium, cesium, and any combination thereof; optionally, at least one second promoter selected from the group consisting of calcium, magnesium, boron, aluminum, and any combination thereof; and at least one structural promoter. The structural promoter comprises at least one refractory oxide selected from the group consisting of silica, alumina, titania, zirconia, silica, or any combinations thereof, preferably alumina and silica or any combination, more preferably silica. The present Fischer-Tropsch catalyst is characterized by a low water-gas shift activity; and high selectivity and productivity toward a hydrocarbon wax.

The present invention further presents one method of making a Fischer-Tropsch catalyst wherein said method comprises the steps of precipitating at least one iron compound; optionally, at least one silver compound; optionally, at least one manganese compound; and optionally, at least one zinc compound; from a suitable solution to provide a precipitate; optionally, washing the precipitate to provide a clean precipitate; adding at least one first promoter compound to a slurry comprising the clean precipitate; optionally, adding at least one second promoter compound to a slurry comprising the clean precipitate; adding at least one structural promoter compound to a slurry comprising the clean precipitate to provide a precursor slurry; spray-drying the precursor slurry to provide catalyst precursor particles; calcining the catalyst precursor particles under suitable conditions to provide a calcined precatalyst; optionally, impregnating the calcined precatalyst with a compound comprising at least one selected from the group consisting of silver, sodium, lithium, potassium, rubidium, cesium and any combination thereof to provide the catalyst; drying the catalyst under suitable conditions to provide a dry catalyst; and calcining the dry catalyst under suitable conditions.

The present invention still further presents a process for producing hydrocarbons comprising contacting a reactant gas mixture comprising synthesis gas with a Fischer-Tropsch catalyst comprising iron; silver; optionally, at least one selected from the group consisting of manganese, zinc and the combination thereof; at least one first promoter selected from the group consisting of sodium, lithium, potassium, rubidium, cesium and any combination thereof; optionally, at least one second promoter selected from the group consisting of calcium, magnesium, boron, aluminum and any combination thereof; and at least one structural promoter. In one preferred embodiment, the Fischer-Tropsch catalyst is contacted with a reactant gas mixture under conditions and in a reactor effective for producing a product mixture comprising a hydrocarbon wax.

DETAILED DESCRIPTION OF THE INVENTION

The present invention discloses, in one aspect, a Fischer-Tropsch catalyst comprising iron; silver; optionally, at least one selected from the group consisting of manganese, zinc and the combination thereof; at least one first promoter selected from the group consisting of sodium, lithium, potassium, rubidium, cesium and any combination thereof; optionally, at least one second promoter selected from the group consisting of calcium, magnesium, boron, aluminum and any combination thereof; and at least one structural promoter. The structural promoter comprises at least one refractory oxide from silica, alumina, titania, zirconia, silica, or any combinations thereof, preferably alumina, silica or any combination, more preferably silica. As used herein, a Fischer-Tropsch catalyst shall refer to any catalyst that is at least partially effective for producing hydrocarbons upon contact with a reactant gas mixture comprising carbon monoxide and hydrogen under suitable conditions.

The Fischer-Tropsch catalyst of the present invention comprises iron. It will be noted that the iron of the present catalyst may be present in said catalyst in a free or combined state. That is, the iron may be present as the zero-valent metal or oxidized as part of a chemical compound, as in for example, iron oxide, iron hydroxide, iron carbide and the like. It will be understood by those of normal skill in the art that the state of the iron in the active catalyst tends not to be well-characterized or definitively known. As used herein, "a Fischer-Tropsch catalyst comprising iron" will be taken to mean a catalyst comprising iron in any given oxidation state ranging, for example, from the zero-valent metal to the compounds of oxidized iron, including, for example, iron oxides, iron hydroxides, iron oxyhydroxides, iron carbides, and the like. The iron will be present in the current catalyst in an amount preferably between about 50 wt % and about 95 wt % of metal to total weight of catalyst; more preferably between about 60 wt % and about 90 wt % of metal to total weight of catalyst; and most preferably between about 70 wt % and about 90 wt % of metal to total weight of catalyst.

The Fischer-Tropsch catalyst of the current invention further comprises silver. Without wishing to be bound by any particular theory, it is believed that the silver serves as a promoter to assist in the reduction of the iron to the catalytically active iron-containing species. As described above for iron, silver may also be present in the catalyst in a free or combined state. In the present Fischer-Tropsch catalyst the silver is present in an amount preferably between about 0.001 wt % and about 5 wt % of metal to total weight of catalyst; more preferably between about 0.001 wt % and about 2 wt % of metal to total weight of catalyst; and most preferably between about 0.005 wt % and 1 wt % of metal to total weight of catalyst.

The Fischer-Tropsch catalyst of the current invention still further comprises at least one first promoter selected from the group consisting of sodium, lithium, potassium, rubidium, cesium and any combination thereof. The catalyst may also comprise at least one second promoter selected from the group calcium, magnesium, boron, aluminum and any combination thereof. It is noted that the designations "first" and "second" promoters do not imply any sort of order of addition or priority of importance. The current designations are intended only to differentiate one class of promoter from the next.

In one preferred embodiment of the present catalyst, one first promoter is lithium. It was found that employing a lithium promoter in combination with silver in an iron-based Fischer-Tropsch catalyst resulted in high activity and selectivity while reducing the normally substantial water-gas shift activity of iron-based catalysts. In particular, the presence of lithium corresponds to high alpha values and low selectivity towards methane, an undesirable product in the Fischer-Tropsch synthesis. If the first promoter is lithium, lithium is present in an amount preferably between about 0.05 wt % and about 5 wt % of metal to total weight of catalyst; and most preferably, between about 0.5 wt % and about 2 wt %. According to this embodiment, calcium is a preferred second promoter; the catalyst so obtained possessing high activity and high selectivity for $C_{18+}$ hydrocarbons in the Fischer-Tropsch process for synthesizing hydrocarbon waxes. In particular, according to this embodiment, the present catalyst will be characterized by a productivity of $C_{5+}$ hydrocarbons of at least 80 g $C_{5+}$ hydrocarbons/h/kg catalyst. Also according to this embodiment, the present catalyst will be further characterized by an Anderson-Schulz-Flory $\alpha$ value of at least about 0.84.

In yet another preferred embodiment, at least two first promoters are included in the Fischer-Tropsch catalyst of the present invention. According to this embodiment, the two first promoters are preferably potassium and lithium. Lithium is present in an amount preferably between about 0.05 wt % and about 5 wt % of metal to total weight of catalyst; and most preferably, between about 0.5 wt % and about 2 wt %. Potassium is present in an amount preferably between about 0.0001 wt % and about 1 wt % of metal to total weight of catalyst; more preferably, between about 0.0005 wt % and about 0.5 wt % of metal to total weight of catalyst; and most preferably, between about 0.0005 wt % and about 0.1 wt % of metal to total weight of support.

In yet another preferred embodiment of the present Fischer-Tropsch catalyst, the second promoter is calcium, magnesium or the combination thereof. Most preferably, the second promoter is calcium. According to this embodiment, the calcium is present in an amount preferably between about 0.001 wt % and about 4 wt % of element to total weight of catalyst; more preferably, between about 0.5 wt % and about 3 wt % of element to total weight of catalyst.

In yet another preferred embodiment of the Fischer-Tropsch catalyst of the present invention, a structural promoter comprises at least one metal oxide selected from the group consisting of silica, alumina, titania, zirconia, or any combinations thereof; preferably alumina, silica or any combination thereof; more preferably silica. The catalyst comprises between about 5 and about 45 parts by weight (pbw) metal oxide per 100 parts iron. When the structural promoter is derived from two compounds of the same metal oxide, a colloidal sol of the metal oxide comprises one of the compounds and provides between about 50% and about 80% of the total pbw metal oxide. The fraction is calculated by dividing the parts by weight of metal oxide from colloidal metal oxide per the total parts by weight of metal oxide. When the structural promoter comprises silica, silica is preferably derived from two silicon-containing compounds, such as silicic acid and colloidal silica, the fraction of silica from silicic acid is between about 20% and about 50% and the fraction of silica from colloidal silica is between about 50% and about 80%. The fraction is calculated by dividing the parts by weight of silica from silicic acid or from colloidal silica per the total parts by weight of silica. More specifically, in one preferred embodiment, the structural promoter comprises between about 15 and about 35 pbw silica per 100 parts iron, and between about 20% and about 50% silica is from from silicic acid; and between about 50% and about 80% silica is from from colloidal silica. As an example only, when the catalyst comprises 25 pbw silica per 100 parts of iron, about 5 to about 12 pbw silica comes from silicic acid and about 13 to about 20 pbw from colloidal silica. Also according to this embodiment, the colloidal silica has an average particle size between about 10 nm and about 100 nm.

The present Fischer-Tropsch catalyst is characterized by a low water-gas shift activity; in particular, the catalyst has a $CO_2$ selectivity no greater than about 18 mol % $CO_2$; preferably no greater than about 13 mol % $CO_2$. The $CO_2$ selectivity is defined by the percentage of the number of moles of carbon monoxide (CO) converted to $CO_2$ divided by the number of moles of CO converted to all products. The present Fischer-Tropsch catalyst is further characterized by the ability to produce, under suitable conditions and in a suitable reactor environment, a product mixture comprising a hydrocarbon wax.

According to a preferred embodiment, the present Fischer-Tropsch catalyst is characterized by a physical catalyst attrition preferably less than about 8 wt % fines; more preferably less than about 6 wt % fines where wt % fines is defined as (weight of fines collected in the thimble filter/weight of the total catalyst recovered)×100% and used herein as the definition for catalyst attrition. Physical catalyst attrition was measured by the Jet Cup method, as described in, for example, Ind. Eng. Chem. Res. 2001, vol. 40, pp. 1065–1075, incorporated herein by reference. The present catalyst is suitable for use in mechanically and/or physically demanding reactor environments, as found in, for example, slurry bubble column reactors or fixed bed reactors.

The present catalyst is still further characterized by a $CH_4$ selectivity not greater than about 6 wt % $CH_4$.

In another aspect of the present invention is presented one method of making a Fischer-Tropsch catalyst wherein said method comprises precipitating at least one iron compound; optionally, at least one silver compound; optionally, at least one manganese compound; and optionally at least one zinc compound from a suitable solution and under suitable conditions to provide a precipitate; optionally washing the precipitate to provide a clean precipitate; adding at least one first promoter compound to a slurry comprising the clean precipitate; optionally, adding at least one second promoter compound to a slurry comprising the clean precipitate; adding at least one structural promoter compound to a slurry comprising the clean precipitate to provide a precursor slurry; spray-drying the precursor slurry to provide catalyst precursor particles; calcining the catalyst precursor particles under suitable conditions to provide a calcined precatalyst; optionally, impregnating the calcined precatalyst with a compound comprising at least one selected from the group consisting of silver, sodium, lithium, potassium, rubidium, cesium and any combination thereof to provide the catalyst; drying the catalyst under suitable conditions to provide a dry catalyst; and calcining the dry catalyst under suitable conditions.

One preferred embodiment of the present method comprises the steps of precipitating at least one iron compound from a suitable solution to provide a precipitate; washing the co-precipitate to provide a clean precipitate; adding at least two first promoter compounds including a compound comprising lithium and a compound comprising potassium to a slurry comprising the clean precipitate; further adding at least one second promoter compound including a compound comprising calcium to a slurry comprising the clean precipitate; further adding at least one structural promoter compound comprising a metal oxide sol to a slurry comprising the clean precipitate to provide a precursor slurry; spray-drying the precursor slurry to provide catalyst precursor particles; calcining the catalyst precursor particles under suitable conditions to provide a calcined precatalyst; impregnating the calcined precatalyst with a compound comprising silver to provide the catalyst; drying the catalyst under suitable conditions to provide a dry catalyst; calcining the dry catalyst under suitable conditions.

Another preferred embodiment of the present method comprises precipitating at least one iron compound, and at least one silver compound; optionally at least one manganese compound; and optionally, at least one zinc compound; from a suitable solution to provide a precipitate, optionally washing the precipitate to provide a clean precipitate; adding at least one first promoter compound to a slurry comprising the clean precipitate; optionally, adding at least one second promoter compound to a slurry comprising the clean precipitate; adding at least one structural promoter compound to a slurry comprising the clean precipitate to provide a precursor slurry; spray-drying the precursor slurry to provide catalyst precursor particles; calcining the catalyst precursor particles under suitable conditions to provide a calcined precatalyst; impregnating the calcined precatalyst with another first promoter compound to provide the catalyst; drying the catalyst under suitable conditions to provide a dry catalyst; and calcining the dry catalyst under suitable conditions.

Yet another preferred embodiment of the present method comprises precipitating at least one iron compound, at least one silver compound, optionally at least one manganese compound, and optionally at least one zinc compound from a suitable solution and under suitable conditions to provide a precipitate; optionally washing the precipitate to provide a clean precipitate; adding at least one first promoter compound comprising lithium to a slurry comprising the clean precipitate; further adding at least one second promoter compound comprising calcium to a slurry comprising the clean precipitate; adding at least one structural promoter compound comprising metal oxide sol to a slurry comprising the clean precipitate to provide a precursor slurry; spray-drying the precursor slurry to provide catalyst precursor particles; calcining the catalyst precursor particles under suitable conditions to provide a calcined precatalyst; impregnating the calcined precatalyst with a compound comprising potassium to provide the catalyst; drying the catalyst under suitable conditions to provide a dry catalyst; calcining the dry catalyst under suitable conditions.

The current methods of making a Fischer-Tropsch catalyst comprise, in part, precipitating at least one iron compound from a suitable solution and under suitable conditions to provide a precipitate. It will be understood that there are many insoluble compounds of iron that can precipitate from an aqueous solution; according to the present methods, however, the precipitate preferably comprises iron oxides, iron hydroxides and/or iron oxyhydroxides. It will be further understood by one of normal skill in the art that a suitable solution may comprise any one or combination of soluble iron compounds, including, but not limited to the iron halides, nitrates, chlorides, acetates and the like. Iron nitrate nonahydrate is a particularly preferred soluble iron compound for use in the present methods of preparation.

According to the present methods, precipitating at least one iron compound preferably comprises adding a sufficient quantity of a basic solution. Suitable basic solutions may comprise, for example, ammonium carbonate, ammonium bicarbonate, ammonium hydroxide, sodium carbonate, sodium bicarbonate and the like. Preferably the basic solution will have a concentration between about 1 M and 3 M. Preferably, the basic solution will be added to a solution comprising a soluble iron compound. Iron(III) nitrate nonahydrate ($Fe(NO_3)_3.9H_2O$) is a preferred soluble iron compound. Suitable conditions sufficient for providing a precipitate preferably comprise a pH of the soluble iron compound solution between about 6 and about 9.

The current method may further comprise washing the precipitate to provide a clean precipitate. This step is preferred to remove excess ions, salts and contaminants that may hinder subsequent promoter deposition. Although any suitable method may be used to wash the precipitate, a preferred method comprises washing the precipitate with deionized water under vacuum filtration.

According to a preferred embodiment of the present invention, at least two first promoter compounds are added to a slurry comprising the clean precipitate. Preferably, the two first promoter compounds will comprise lithium and potassium.

In an alternative embodiment, at least one first promoter compound is added to a slurry comprising the clean precipitate. According to this embodiment, the first promoter compound comprises lithium. Particularly preferred lithium compounds are lithium nitrate ($LiNO_3$) and lithium carbonate ($Li_2CO_3$).

The present methods still further comprise adding at least one structural promoter compound to a slurry comprising the clean precipitate to provide a precursor slurry. The structural promoter comprises at least one metal oxide selected from the group consisting of silica, alumina, titania, zirconia, or any combinations thereof, preferably at least one metal oxide from alumina, silica or any combination, more preferably silica. Many different materials and compounds of widely varying particle morphology may be used in the present method as the structural promoter. The structural promoter compound may be added concurrently, simultaneously or sequentially with respect to the first promoter compound. When the first promoter compound comprises lithium, the structural promoter preferably comprises silicon, and the structural promoter compound preferably comprises silicic acid.

In an alternate embodiment, at least two structural promoter compounds are added. When the structural promoter is derived from two compounds of the same metal oxide, one of the compounds is preferably a colloidal sol of the metal oxide. When the structural promoter comprises at least silicon, two silicon compounds preferably comprise silicic acid and colloidal silica, respectively. A colloidal silica with an average particle size between about 10 nm and about 100 nm is preferred. One such example is the AS-40 colloidal silica with an average particle dimensions of about 22 nm from Aldrich In a particularly preferred embodiment, the two structural promoter compounds are added in amounts effective for providing in the spray-dried product a total metal oxide content of between about 5 parts of silica and about 45 parts of metal oxide per 100 parts of iron. When the structural promoter is derived from a colloidal sol of the metal oxide and another compound, the colloidal sol provides between about 50% and about 80% of the total pbw metal oxide and the other compound provides between about 20% and about 50% of the total pbw metal oxide.

In a particularly preferred embodiment, when the structural promoter comprises silicon, the two silicon compounds are preferably silicic acid and colloidal silica which are added in amounts effective for providing in the spray-dried product a total silica content of between about 5 parts of silica and about 45 parts of silica per 100 parts of iron. More particularly, silicic acid is added in an amount effective for providing in the spray-dried product between about 20% and about 50% of silica from silicic acid, and colloidal silica provides between about 50% and 80% of the silica.

According to another preferred embodiment, silicic acid and colloidal silica are added in amounts effective for providing in the spray-dried product a total of between about 15 parts of silica and about 35 parts of silica per 100 parts of iron, and between about 20% and about 50% of silica from silicic acid, and between about 50% and 80% of the silica is from colloidal silica. More particularly, according to one particular embodiment, silicic acid and colloidal silica are added in amounts effective for providing in the spray-dried product a total silica content of between about 25 parts of silica per 100 parts of iron with between about 5 and about 12 pbw silica from silicic acid and between about 13 and about 20 pbw silica from colloidal silica.

According to the present method, the first and second promoter compounds may be added in any order or simultaneously. When the first and second promoter compounds are added, the first promoter compound preferably comprises lithium and the second promoter compound preferably comprises calcium.

The method still further comprises calcining the catalyst particles under suitable conditions to provide a calcined precatalyst. Preferred conditions for calcining the catalyst particles comprise a temperature between about 200° C. and about 500° C., preferably between about 250° C. and about 400° C.; and for a period of time between about 0.5 hours and about 24 hours, preferably between about 1 hour and about 5 hours.

The present method of making a Fischer-Tropsch catalyst may still further comprise impregnating the calcined precatalyst with a silver compound to provide the catalyst. Although any suitable silver compound may be used in the current invention, silver(I) nitrate ($AgNO_3$) is a preferred silver compound. And even though any suitable technique of impregnation may be used in the current invention, incipient wetness impregnation is a preferred technique of impregnation.

The method of making the present Fischer-Tropsch catalyst further comprises drying the catalyst under suitable conditions to provide a dry catalyst. Although any set of suitable conditions may comprise said drying and will be those capable of removing water and solvents; particularly preferred conditions comprise drying the catalyst at a temperature between about 80° C. and about 150° C.; and an interval of time between about 2 hours and about 20 hours.

The present method of making a Fischer-Tropsch catalyst still further comprises calcining the dry catalyst under suitable conditions. Preferably, suitable conditions comprise calcining the dry catalyst at a temperature between about 200° C. and about 350° C., preferably between about 250° C. and about 300° C.; for a period of time between about 0.5 hour and about 10 hours, preferably between about 1 hour and about 5 hours.

The present method of making a Fischer-Tropsch catalyst may still further comprise reducing the catalyst under conditions suitable for providing the reduced catalyst. Suitable conditions may comprise exposure to a suitable gas at elevated temperature; preferred gases include those comprising hydrogen or carbon monoxide; more preferred gases include pure hydrogen, pure carbon monoxide and the mixture thereof. The gas may comprise an amount of hydrogen between about 1% and about 100% by volume; and may further comprise an amount of carbon monoxide between about 1% and about 100% by volume. In one embodiment, suitable conditions comprise exposing the catalyst to a suitable gas at a temperature between about 75° C. and about 500° C.; for a period of time between about 0.5 hours and about 50 hours; and a pressure between about 1 atm and about 75 atm.

According to the present method, the catalyst is characterized by a $CO_2$ selectivity preferably not greater than about 18 mol % $CO_2$; more preferably not greater than about 13 mol % $CO_2$. The catalyst of the present method is further characterized by a physical catalyst attrition of preferably less than about 8 wt %; more preferably less than about 6 wt %.

The present invention also discloses a catalyst made according to the present method.

In yet another aspect of the present invention is presented a process for producing hydrocarbons comprising contacting a reactant gas mixture comprising synthesis gas with a Fischer-Tropsch catalyst comprising iron; silver; optionally, at least one selected from the group consisting of manganese, zinc and the combination thereof; at least one first promoter selected from the group consisting of sodium, lithium, potassium, rubidium, cesium and any combination thereof; optionally, at least one second promoter selected from the group consisting of calcium, magnesium, boron, aluminum and any combination thereof; and at least one structural promoter under suitable conditions and in a suitable reactor. In the present process, the Fischer-Tropsch catalyst is contacted with a reactant gas mixture preferably under conditions and in a reactor effective for producing a product mixture comprising a hydrocarbon wax. The structural promoter comprises at least one metal oxide selected from silica, alumina, titania, zirconia, or any combinations thereof; preferably alumina, silica or any combination; more preferably silica.

The present process comprises contacting a reactant gas mixture comprising synthesis gas with a Fischer-Tropsch catalyst. The synthesis gas used in the present process may be derived from the partial oxidation of any carbonaceous or hydrocarbonaceous material including, but not limited to, coal, natural gas, wastes, wood, and the like. Preferred synthesis gas source materials include coal and natural gas. Several methods of partial oxidation of synthesis gas source materials exist and are well-known within the art; these include steam reforming and partial oxidation with air or oxygen. Partial oxidation of natural gas as a method and source of at least a portion of the synthesis gas is particularly preferred in the present process.

The synthesis gas used in the present process comprises carbon monoxide and hydrogen. Some other substances may be present in small amounts in the synthesis gas including argon, nitrogen, methane, hydrogen sulfide, hydrogen cyanide and carbon dioxide. The ratio of $H_2$:CO in the synthesis gas is preferably between about 1:1 and about 4:1; and most preferably is between about 1.4:1 and about 2.3:1.

The Fischer-Tropsch catalyst of the present process is substantially similar to that outlined above in connection with other aspects and embodiments of this invention. In a preferred embodiment of the present process, the Fischer-Tropsch catalyst comprises iron, silver, a lithium first promoter, a calcium second promoter and two structural promoters comprising one metal oxide. According to this embodiment, two structural promoters comprising one metal oxide are added in amounts effective for providing in the spray-dried product a total metal oxide content of between about 5 parts of silica and about 45 parts of metal oxide per 100 parts of iron. When the structural promoter is derived from a colloidal metal oxide and another compound, the colloidal metal oxide provides between about 50% and about 80% of the total pbw metal oxide and the other compound provides between about 20% and about 50% of the total pbw metal oxide. The metal oxide is preferably at least one of silica, alumina, zirconia, titania, more preferably silica, alumina, or any combination, still more preferably silica. When the metal oxide is silica, two structural promoters comprising silicon are preferably silicic acid and colloidal silica. According to this embodiment, two structural promoters comprising silicon comprise between about 5 and about 45 parts by weight (pbw) silica per 100 parts iron; more particularly, the silica comprises between about 20% and about 50% silica from silicic acid and between about 50% to about 80% silica is from colloidal silica. Most preferably, according to this embodiment, two structural promoters comprising silicon comprise between about 15 and about 35 parts by weight (pbw) silica per 100 parts iron. According to another embodiment with 25 pbw of silica per 100 pbw of iron, the structural promoters are present in amounts between about 5 and about 12 parts by weight (pbw) silica from silicic acid and about 13 and about 20 parts by weight (pbw) silica from colloidal silica.

The present process produces a product mixture comprising a hydrocarbon wax. As used herein, a hydrocarbon wax will be taken to mean a product comprising various hydrocarbons that exists as a solid at ambient conditions (room temperature and atmospheric pressure). The hydrocarbon wax preferably comprises hydrocarbons containing at least 18 carbons and greater, hereafter designated $C_{18+}$. The present process will produce a range of hydrocarbons, including gaseous, liquid and solid (wax) products. The distribution of these products is reflected in the selectivity of the reaction, most often characterized by the $\alpha$ value taken from the Anderson-Schulz-Flory plot, known to those of normal skill in the art. In a preferred embodiment of the process, the product mixture is characterized by an $\alpha$ value of at least 0.84.

The present process is also highly productive for hydrocarbons. Productivity in the Fischer-Tropsch synthesis is typically measured as the production rate at which all hydrocarbons of at least five carbon atoms are produced from the reactor per weight of catalyst, hereinafter designated g $C_{5+}$/h/kg cat. In one preferred embodiment of the present process, $C_{5+}$ hydrocarbons are produced at a rate of at least 50 g $C_{5+}$/h/kg cat, more preferably at least 80 g $C_{5+}$/h/kg cat.

The present process is also highly selective producing primarily a waxy hydrocarbon product and a minimum of methane. In a Fischer-Tropsch process for producing a hydrocarbon wax, production of methane is regarded as contributing to process inefficiency. In one preferred embodiment of the present process, methane comprises not more than 6 wt % of the product mixture.

The present process for producing hydrocarbons is further characterized by a catalyst that manifests a very low water gas shift (WGS) activity for an iron-based catalyst. As described earlier, water-gas shift renders several changes in a Fischer-Tropsch process including a loss of efficiency due to conversion of CO to $CO_2$ and an alteration of the $H_2$:CO ratio resulting in a marked change in product distribution. According to the present process, the catalyst is characterized by a $CO_2$ selectivity preferably not greater than about 18 mol % $CO_2$; more preferably not greater than about 13 mol % $CO_2$.

The catalyst used in the present process is still further characterized by very low physical catalyst attrition. As described above, high physical catalyst attrition can lead to numerous problems in the course of the Fischer-Tropsch synthesis. In some preferred embodiments, the catalyst is characterized by a physical catalyst attrition of preferably less than about 8 wt %; more preferably less than about 6 wt %.

The present process may be conducted in any reactor suited for the Fischer-Tropsch process including fixed bed, ebulliating bed, fluidized bed, entrained bed and slurry bubble column reactors. Preferred reactors for the present process include slurry bubble column and fixed bed reactors.

The conditions to be used in the present process are those that are best suited to provide a hydrocarbon wax in good yield with a minimum of methane and $CO_2$ production. Although many different sets of conditions may exist that can be used in the present process, preferred conditions comprise a temperature between about 180° C. and about 300° C. and a pressure between about 80 psia (552 kPa) to about 1000 psia (6895 kPa).

The invention will be further described and enabled to one of normal skill in the art by the following non-limiting examples. It shall be understood that the following examples are not meant to limit the scope of the invention in any way, but rather clarify the manner in which the invention may be practiced.

EXAMPLES

Example 1

A commercially available catalyst having a composition of $100Fe/4.2K/5Cu/25SiO_2$ was used as a standard for comparison. The catalyst was pretreated in a reducing atmosphere comprising $H_2$ at 200° C. for 16 h. The pretreated catalyst was reacted with synthesis gas ($H_2/CO=2$) in a fixed bed test reactor at a temperature of 230° C., a pressure of 360 psig, and a gas space velocity of 2.5 NL/g-cat/h (Normal Liters/gram of catalyst/hour). The results of the reactor test including CO conversion, methane selectivity, $C_5+$ and $CO_2$ productivity can be found in Table 1.

Example 2

The commercially available catalyst of Example 1 was prepared and tested in the same manner as described in Example 1 with the change that the catalyst was pretreated with CO at 280° C. for 12 h. The results of the reactor test including CO conversion, methane selectivity, $C_{5+}$ and $CO_2$ productivity can be found in Table 1.

Example 3

This example describes the preparation and testing of a catalyst of composition $100Fe/2Li/1Ag/10SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $LiNO_3$ and silicic acid was added to a slurry comprising the iron precipitate. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in air at 280° C. for 2 h. This catalyst was pretreated with $H_2$ at 200° C. for 16 h. The testing results may be found in Table 1.

Example 4

This example describes the preparation and testing of a catalyst of composition $100Fe/2Li/1Ag/10SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $Li_2CO_3$ and silicic acid was added to a slurry comprising the iron precipitate. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in the air at 280° C. for 2 h. The testing results may be found in Table 1.

Example 5

This example describes the preparation and testing of a catalyst of composition $100Fe/2Li/1Ag/25SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $Li_2CO_3$ was added to a slurry comprising the iron precipitate. The catalyst slurry was further slurried with silicic acid and deionized AS-40 (22 nm) colloidal silica in amounts sufficient to provide in the spray dried particles about 10 parts by weight (pbw) silica from the silicic acid and 15 pbw silica from the colloidal silica. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in air at 280° C. for 2 h. The testing results may be found in Table 1.

Example 6

The procedure of EXAMPLE 5 was used with the change that the amount of $Li_2CO_3$ was selected to produce a catalyst of composition $100Fe/4Li/1Ag/25SiO_2$. The testing results may be found in Table 1.

Example 7

This example describes the preparation and testing of a catalyst of composition $100Fe/2Li/1Ag/1.5Ca/25SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $Li_2CO_3$, and $CaCO_3$ was added to a slurry comprising the iron precipitate. The catalyst slurry was further slurried with silicic acid and deionized AS-40 (22 nm) colloidal silica in amounts sufficient to provide in the spray dried particles about 10 parts by weight (pbw) silica from the silicic acid and 15 pbw silica from the colloidal silica. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in air at 280° C. for 2 h. The testing results may be found in Table 1.

Example 8

The procedure of EXAMPLE 7 was used except that the amount of Ca was selected to produce a catalyst of composition $100Fe/2Li/1Ag/3Ca/25SiO_2$. The testing results may be found in Table 1.

Example 9

This example describes the preparation and testing of a catalyst of composition $100Fe/0.2K/4Li/1Ag/25SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $Li_2CO_3$ and $KHCO_3$ was added to a slurry comprising the iron precipitate. The catalyst slurry was further slurried with silicic acid and deionized AS-40 (22 nm) colloidal silica in amounts sufficient to provide in the spray dried particles about 10 pbw silica from silicic acid and 15 pbw silica from the colloidal silica. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in air at 280° C. for 2 h. The testing results may be found in Table 1.

Example 10

This example describes the preparation and testing of a catalyst of composition $100Fe/3K/1.2Li/2Ag/25SiO_2$. An iron precipitate was prepared by adding a 1.0 M ammonium carbonate solution to a 1.0 M $Fe(NO_3)_3.9H_2O$ solution at a constant pH of 6.0. The iron precipitate was thoroughly washed with deionized water by vacuum filtration. An aqueous solution comprising $Li_2CO_3$, $KHCO_3$ and silicic acid was added to a slurry comprising the iron precipitate. The slurry was spray dried and calcined in air at 300° C. for 5 h. The spray-dried product was impregnated with an aqueous solution of $AgNO_3$ in an amount sufficient to deliver the desired loading of silver via the technique of incipient wetness impregnation. The catalyst was dried for 16 h at 120° C. and calcined in air at 280° C. for 2 h. The testing results may be found in Table 1, wherein CO conversion is expressed as mol % of CO converted to products, $C_1$ selectivity is expressed as wt % of methane relative to total hydrocarbons produced, $C_{5+}$ productivity is the mass of hydrocarbons of at least 5 carbons atoms produced per hour per kilogram catalyst, alpha is derived from the Anderson-Schulz-Flory plot and $CO_2$ selectivity is mol % $CO_2$ relative to CO converted to all products.

TABLE 1

Fixed Bed Testing[a]

| Ex. No. | Composition | TOS[b] (h) | CO Conversion (mol %) | $C_1$ (wt %) | $C_{5+}$ (g/h/kg cat) | Alpha | $CO_2$ Selectivity (mol %) |
|---|---|---|---|---|---|---|---|
| 1 | $100Fe/4.2K/5Cu/25SiO_2$ | 82.5 | 55.6 | 4.0 | 190 | 0.94 | 18.5 |
| 2[c] | $100Fe/4.2K/5Cu/25SiO_2$ | 74.0 | 72.3 | 5.7 | 227 | 0.91 | 23.1 |
| 3 | $100Fe/2Li/1Ag/10SiO_2$ | 82.5 | 21.8 | 5.5 | 81 | 0.90 | 10.7 |
| 4[c] | $100Fe/2Li/1Ag/10SiO_2$ | 96.0 | 34.3 | 5.8 | 97 | 0.87 | 10.4 |
| 5 | $100Fe/2Li/1Ag/25SiO_2$ | 96.0 | 31.6 | 6.9 | 91 | 0.84 | 10.1 |
| 6 | $100Fe/4Li/1Ag/25SiO_2$ | 96.0 | 31.2 | 9.4 | 83 | — | 10.8 |
| 7 | $100Fe/2Li/1Ag/1.5Ca/25SiO_2$ | 96.0 | 27.7 | 7.6 | 158 | 0.89 | 12.3 |
| 8 | $100Fe/2Li/1Ag/3Ca/25SiO_2$ | 96.0 | 36.6 | 9.0 | 194 | 0.84 | 12.7 |
| 9 | $100Fe/0.2K/4Li/1Ag/25SiO_2$ | 96.0 | 31.3 | 7.2 | 173 | 0.90 | 12.3 |
| 10 | $100Fe/3K/1.2Li/2Ag/25SiO_2$ | 72.0 | 40.1 | 3.9 | 140 | 0.94 | 17.3 |

[a]Conditions: reductive pretreatment in H2 at 190–200° C. for 16 h unless otherwise noted; space velocity 2.0–2.5 NL/h/g; molar H2/CO = 2; T = 230–240° C.; P = 360 psig;
[b]TOS = time on stream;
[c]reductive pretreatment in CO at 280° C. for 12 h.

Examples 11–15

The catalysts of EXAMPLES 5–9 were evaluated for catalyst attrition resistance. Testing was carried out according to the Jet-Cup technique well known to those of normal skill in the art. The results are shown as EXAMPLES 11–15 in Table 2 below where attrition loss in wt % fines is defined as (weight of fines collected in the thimble filter/weight of the total catalyst recovered)×100% as used in Ind. Eng. Chem. Res. 2001, v. 40, pp. 1065–1075, incorporated herein by reference. A published example is provided as a reference for comparison (Ind. Eng. Chem. Res. 2001, v. 40, pp. 1065–1075).

TABLE 2

Catalyst Attrition Measurements

| Example | Catalyst Composition | Attrition Loss (wt %) |
|---|---|---|
| 11 | $100Fe/2Li/1Ag/25SiO_2$ | 7.2 |
| 12 | $100Fe/4Li/1Ag/25SiO_2$ | 4.5 |
| 13 | $100Fe/2Li/1Ag/1.5Ca/25SiO_2$ | 4.6 |
| 14 | $100Fe/2Li/1Ag/3Ca/25SiO_2$ | 5.4 |
| 15 | $100Fe/0.2K/4Li/lAg/25SiO_2$ | 3.9 |
| Reference | $100Fe/4.2K/5Cu/10SiO_2$ | 8.7 |

Example 16

The catalyst of EXAMPLE 3 was tested in a continuous stirred tank reactor (CSTR). The results are present in Table 3 wherein the units are as described for Table 1.

TABLE 3

Continuous Stirred Reactor Testing[a]

| Ex. No. | Composition | TOS[b] (h) | CO Conversion (mol %) | $C_1$ (wt %) | $C_{5+}$ (g/h/kg cat) | $CO_2$ Selectivity (mol %) |
|---|---|---|---|---|---|---|
| 16 | $100Fe/2Li/1Ag/10SiO_2$ | 500 | 32 | 3.5 | 95 | 7 |

[a]Conditions: reductive pretreatment in $H_2$ at 190–200° C. for 16 h unless otherwise noted; space velocity 2.0–2.5 NL/h/g; molar $H_2/CO$ = 2; T = 230–240° C.; P = 360 psig;
[b]TOS = time on stream.

The present application incorporates by reference commonly assigned application U.S., application Ser. No. 10/743,856, entitled "Attrition Resistant Bulk Metal Catalysts And Methods Of Making And Using Same", filed concurrently herewith.

While preferred embodiments of this invention have been shown and described, modifications thereof can be made by one skilled in the art without departing from the spirit or teaching of this invention. The embodiments described herein are exemplary only and are not limiting. Many variations and modifications of system and methods are possible and are within the scope of the invention. Accordingly, the scope of protection is not limited to the embodiments described herein, but is only limited by the claims that follow, the scope of which shall include all equivalents of the subject matter of the claims.

What is claimed is:

1. A process for producing hydrocarbons comprising contacting a reactant gas mixture comprising synthesis gas with a Fischer-Tropsch catalyst comprising
iron;
silver;
optionally, at least one selected from the group consisting of manganese, zinc and the combination thereof;
a first promoter comprising lithium, wherein lithium is present in an amount between about 0.05 wt % and about 5 wt % of metal to total weight of catalyst;
optionally, at least one second promoter selected from the group consisting of calcium, magnesium, boron, aluminum and any combination thereof; and
at least one structural promoter;
under suitable conditions and in a suitable reactor so as to produce a product mixture.

2. The process according to claim 1 wherein the process is effective for producing the product mixture comprising hydrocarbon wax.

3. The process according to claim 1 wherein the ratio of $H_2$:CO in said synthesis gas is between about 1.4:1 and about 4:1.

4. The process according to claim 1 wherein the ratio of $H_2$:CO in said synthesis gas is between about 1.4:1 and about 2.3:1.

5. The process according to claim 1 wherein the Fischer-Tropsch catalyst comprises iron, silver, a calcium second promoter and two structural promoters comprising a metal oxide.

6. The process according to claim 1 wherein the structural promoter comprises at least one metal oxide selected from the group consisting of silica, alumina, zirconia, titania and any combination thereof.

7. The process according to claim 1 wherein the structural promoter comprises a metal oxide which comprises between about 5 and about 45 parts by weight (pbw) of a metal oxide per 100 parts iron.

8. The process according to claim 7 wherein the structural promoter comprises at least one selected from the group consisting of silica, alumina and the combination thereof.

9. The process according to claim 8 wherein the structural promoter comprises silica.

10. The process according to claim 9 wherein the silica comprises between about 50% and about 80% silica from a colloidal silica.

11. The process according to claim 10 wherein the colloidal silica has an average particle size between about 10 nm and about 100 nm.

12. The process according to claim 9 wherein the silica comprises between about 20% and about 50% silica from silicic acid.

13. The process according to claim 9 wherein silica comprises between about 15 and about 35 parts by weight (pbw) silica per 100 parts iron.

14. The process according to claim 13 wherein the silica comprises between about 50% and about 80% silica from colloidal silica and between about 20% and about 50% silica from silicic acid.

15. The process according to claim 5 wherein two structural promoters are silicic acid and colloidal silica.

16. The process according to claim 5 wherein the structural promoters comprising silicon comprise between about 5 and about 45 parts by weight (pbw) silica per 100 parts iron.

17. The process according to claim 16 wherein the silica comprises between about 20% and about 50% silica from silicic acid.

18. The process according to claim 1 wherein said product mixture is characterized by an $\alpha$ of at least 0.84.

19. The process according to claim 1 wherein the product mixture comprises $C_{5+}$ hydrocarbons and the $C_{5+}$ hydrocarbons are produced at a rate of at least 50 g $C_{5+}$/h/kg cat.

20. The process according to claim 19 wherein $C_{5+}$ hydrocarbons are produced at a rate of at least 80 g $C_{5+}$/h/kg cat.

21. The process according to claim 1 wherein methane comprises not more than about 6 wt % of said product mixture.

22. The process according to claim 1 wherein the catalyst is characterized by a $CO_2$ selectivity not greater than about 18 mol % $CO_2$.

23. The process according to claim 1 wherein the catalyst is characterized by a $CO_2$ selectivity not greater than about 13 mol % $CO_2$.

24. The process according to claim 1 wherein the catalyst is characterized by a physical catalyst attrition of less than about 8%.

25. The process according to claim 1 wherein the catalyst is characterized by a physical catalyst attrition of less than about 6%.

26. The process according to claim 1 wherein the suitable reactor is selected from the group consisting of fixed bed, ebulliating bed, fluidized bed, entrained bed and slimy bubble column reactors.

27. The process according to claim 26 wherein the suitable reactor is selected from the group consisting of slurry bubble column and fixed bed reactors.

28. The process according to claim 1 wherein suitable conditions comprise a temperature between about 180° C. and about 300° C. and a pressure between about 80 psia (552 kPa) and about 1000 psia (6895 kPa).

29. The process according to claim 1 wherein the catalyst is capable of producing the product mixture comprising a hydrocarbon wax when contacted with the reactant gas mixture comprising carbon monoxide and hydrogen under suitable conditions of temperature and pressure.

30. The process according to claim 1 wherein the iron is present in an amount between 50 wt % and 95 wt % of metal to total weight of catalyst.

31. The process according to claim 1 wherein the iron is present in an amount between 60 wt % and 90 wt % of metal to total weight of catalyst.

32. The process according to claim 1 wherein the iron is present in an amount between 70 wt % and 90 wt % of metal to total weight of catalyst.

33. The process according to claim 1 wherein the silver is present in an amount between 0.001 wt % and 5 wt % of metal to total weight of catalyst.

34. The process according to claim 1 wherein the silver is present in an amount between 0.001 wt % and 2 wt % of metal to total weight of catalyst.

35. The process according to claim 1 wherein the silver is present in an amount between 0.005 wt % and 1 wt % of metal to total weight of catalyst.

36. The process according to claim 1 wherein lithium is present in an amount between 1.2 and 4 parts by weight of lithium per 100 parts iron.

37. The process according to claim 1 wherein lithium is present in an amount between about 0.5 wt % and about 2 wt %.

38. The process according to claim 1 wherein the second promoter is calcium.

39. The process according to claim 1 wherein the catalyst further comprises another first promoter selected from the group consisting of sodium, potassium, rubidium, cesium and any combination thereof.

40. The process according to claim 39 wherein the catalyst further comprises potassium.

41. The process according to claim 40 wherein lithium is present in an amount between about 0.05 wt % and about 5 wt % of metal to total weight of catalyst.

42. The process according to claim 40 wherein lithium is present in an amount between about 0.5 wt % and about 2 wt % of metal to total weight of catalyst.

43. The process according to claim 40 wherein potassium is present in an amount between about 0.0001 wt % and about 1 wt % of metal to total weight of catalyst.

44. The process according to claim 40 wherein potassium is present in an amount between about 0.0005 wt % and about 0.5 wt % of metal to total weight of catalyst.

45. The process according to claim 40 wherein potassium is present in an amount between about 0.0005 wt % and about 0.1 wt % of metal to total weight of catalyst.

46. The process according to claim 40 wherein potassium is present in an amount between about 0.0005 wt % and about 0.05 wt % of metal to total weight of support.

47. The process according to claim 1 wherein the at least one second promoter comprises calcium, magnesium or the combination thereof.

48. The process according to claim 47 wherein the at least one second promoter is calcium.

49. The process according to claim 48 wherein calcium is present in an amount between about 0.001 wt % and about 4 wt % of element to total weight of catalyst.

50. The process according to claim 48 wherein calcium is present in an amount between 0.5 wt % and 3 wt % of element to total weight of catalyst.

51. The process according to claim 29 wherein said hydrocarbon wax comprises $C_{18+}$ hydrocarbons.

52. The process according to claim 1 wherein the catalyst is characterized by an Anderson-Schulz-Flory $\alpha$ value of at least about 0.84.

53. The process according to claim 1 wherein the structural promoter comprises silica.

54. A process for producing hydrocarbons comprising contacting a reactant gas mixture comprising synthesis gas with a Fischer-Tropsch catalyst under suitable conditions and in a suitable reactor so as to produce a product mixture, wherein the Fischer-Tropsch catalyst comprises iron;

silver;

a first promoter comprising lithium;

optionally, at least one second promoter selected from the group consisting of calcium, magnesium, boron, aluminum and any combination thereof; and a structural stabilizer comprising silica, wherein silica comprises between about 5 and about 45 parts by weight (pbw) of silica per 100 parts iron.

55. The process according to claim 54 wherein silica comprises between about 15 and about 35 parts by weight (pbw) silica per 100 parts iron.

56. The process according to claim 54 wherein the silica comprises between about 50% and about 80% silica from a colloidal silica.

57. The process according to claim 56 wherein the colloidal silica has an average particle size between about 10 nm and about 100 nm.

58. The process according to claim 54 wherein the silica comprises between about 20% and about 50% silica from silicic acid.

59. The process according to claim 54 wherein the silica comprises between about 50% and about 80% silica from colloidal silica and between about 20% and about 50% silica from silicic acid.

60. The process according to claim 54 wherein lithium is present in an amount between about 0.05 wt % and about 5 wt % lithium to total weight of catalyst.

61. The process according to claim 54 wherein lithium is present in an amount between about 0.5 wt % and about 2 wt % lithium to total weight of catalyst.

62. The process according to claim 54 wherein lithium is present in an amount between 1.2 and 4 parts by weight (pbw) of lithium per 100 parts iron.

63. The process according to claim 54 wherein iron is present in an amount between 50 wt % and 95% of metal to total weight of catalyst.

64. The process according to claim 54 wherein iron is present in an amount between 60 wt % and 90 wt % of metal to total weight of catalyst.

65. The process according to claim 54 wherein iron is present in an amount between 70 wt % and 90 wt % of metal to total weight of catalyst.

66. The process according to claim 54 wherein silver is present in an amount between 0.001 wt % and 5 wt % of metal to total weight of catalyst.

67. The process according to claim 54 wherein silver is present in an amount between 0.001 wt % and 2 wt % of metal to total weight of catalyst.

68. The process according to claim 54 wherein silver is present in an amount between 0.005 wt % and 1 wt % of metal to total weight of catalyst.

69. The process according to claim 54 wherein the Fischer-Tropsch catalyst further comprises a second promoter, said second promoter comprising calcium, magnesium, or the combination thereof.

70. The process according to claim 54 wherein the Fischer-Tropsch catalyst further comprises calcium as a second promoter.

71. The process according to claim 70 wherein calcium is present in an amount between about 0.001 wt % and about 4 wt % calcium to total weight of catalyst.

72. The process according to claim 70 wherein calcium is present in an amount between 0.5 wt % and 3 wt % calcium to total weight of catalyst.

73. The process according to claim 54 wherein the Fischer-Tropsch catalyst further comprises another first promoter selected from the group consisting of sodium, potassium, rubidium, cesium and any combination thereof.

74. The process according to claim 73 wherein the Fischer-Tropsch catalyst further comprises potassium.

75. The process according to claim 74 wherein potassium is present in an amount between about 0.0001 wt % and about 1 wt % potassium to total weight of catalyst.

76. The process according to claim 74 wherein potassium is present in an amount between about 0.0005 wt % and about 0.5 wt % potassium to total weight of catalyst.

77. The process according to claim 74 wherein potassium is present in an amount between about 0.0005 wt % and about 0.1 wt % potassium to total weight of catalyst.

78. The process according to claim 74 wherein potassium is present in an amount between 0.2 and 3 parts by weight of potassium per 100 parts iron.

79. The process according to claim 54 wherein the catalyst further comprises at least one element selected from the group consisting of manganese, zinc and any combination thereof.

80. The process according to claim 54 wherein the catalyst is characterized by an Anderson-Schulz-Flory $\alpha$ value of at least about 0.84.

81. The process according to claim 54 wherein said product mixture is characterized by an $\alpha$ of at least 0.84.

82. The process according to claim 54 wherein the product mixture comprises $C_{5+}$ hydrocarbons and the $C_{5+}$ hydrocarbons are produced at a rate of at least 50 g $C_{5+}$/h/kg cat.

83. The process according to claim 82 wherein $C_{5+}$ hydrocarbons are produced at a rate of at least 80 g $C_{5+}$/h/kg cat.

84. The process according to claim 54 wherein methane comprises not more than about 6 wt % of said product mixture.

85. The process according to claim 54 wherein the catalyst is characterized by a $CO_2$ selectivity not greater than about 18 mol % $CO_2$.

86. The process according to claim 54 wherein the catalyst is characterized by a $CO_2$ selectivity not greater than about 13 mol % $CO_2$.

87. The process according to claim 54 wherein the catalyst is characterized by a physical catalyst attrition of less than about 8%.

88. The process according to claim 54 wherein the catalyst is characterized by a physical catalyst attrition of less than about 6%.

89. A process for producing hydrocarbons comprising contacting a reactant gas mixture comprising synthesis gas with a Fischer-Tropsch catalyst under suitable conditions and in a suitable reactor so as to produce a product mixture, wherein the Fischer-Tropsch catalyst comprises iron; silver, a first promoter comprising lithium; a second promoter comprising calcium, magnesium, or any combination thereof; and at least one structural promoter.

90. The process according to claim 89 wherein lithium is present in an amount between about 0.05 wt % and about 5 wt % lithium to total weight of catalyst.

91. The process according to claim 89 wherein lithium is present in an amount between about 0.5 wt % and about 2 wt % lithium to total weight of catalyst.

92. The process according to claim 89 wherein lithium is present in an amount between 1.2 and 4 parts by weight (pbw) of lithium per 100 pails iron.

93. The process according to claim 89 wherein iron is present in an amount between 50 wt % and 95 wt % of metal to total weight of catalyst.

94. The process according to claim 89 wherein iron is present in an amount between 60 wt % and 90 wt % of metal to total weight of catalyst.

95. The process according to claim 89 wherein iron is present in an amount between 70 wt % and 90 wt % of metal to total weight of catalyst.

96. The process according to claim 89 wherein silver is present in an amount between 0.001 wt % and 5 wt % of metal to total weight of catalyst.

97. The process according to claim 89 wherein silver is present in an amount between 0.001 wt % and 2 wt % of metal to total weight of catalyst.

98. The process according to claim 89 wherein silver is present in an amount between 0.005 wt %and 1 wt % of metal to total weight of catalyst.

99. The process according to claim 89 wherein the second promoter comprises calcium.

100. The process according to claim 99 wherein calcium is present in an amount between about 0.001 wt % and about 4 wt % of element to total weight of catalyst.

101. The process according to claim 99 wherein calcium is present in an amount between 0.5 wt % and 3 wt % of element to total weight of catalyst.

102. The process according to claim 89 wherein the Fischer-Tropsch catalyst further comprises another first promoter selected from the group consisting of sodium, potassium, rubidium, cesium and any combination thereof.

103. The process according to claim 89 wherein the Fischer-Tropsch catalyst further comprises potassium.

104. The process according to claim 103 wherein potassium is present in an amount between about 0.0001 wt % and about 1 wt % potassium to total weight of catalyst.

105. The process according to claim 103 wherein potassium is present in an amount between about 0.0005 wt % and about 0.5 wt % potassium to total weight of catalyst.

106. The process according to claim 103 wherein potassium is present in an amount between about 0.0005 wt % and about 0.1 wt % potassium to total weight of catalyst.

107. The process according to claim 103 wherein potassium is present in an amount between 0.2 and 3 parts by weight of potassium per 100 parts iron.

108. The process according to claim 89 wherein the structural promoter comprises at least one metal oxide selected from the group consisting of silica, alumina, zirconia, titania and any combination thereof.

109. The process according to claim 89 wherein the structural promoter comprises a metal oxide which comprises between about 5 and about 45 parts by weight (pbw) of a metal oxide per 100 parts iron.

110. The process according to claim 89 wherein the structural promoter comprises at least one selected from the group consisting of silica, alumina and any combination thereof.

111. The process according to claim 89 wherein the structural promoter comprises silica.

112. The process according to claim 111 wherein silica comprises between about 15 and about 35 parts by weight (pbw) silica per 100 parts iron.

113. The process according to claim 111 wherein the silica comprises between about 50% and about 80% silica from a colloidal silica.

114. The process according to claim 113 wherein the colloidal silica has an average particle size between about 10 nm and about 100 nm.

115. The process according to claim 111 wherein the silica comprises between about 20% and about 50% silica from silicic acid.

116. The process according to claim 111 wherein the silica comprises between about 50% and about 80% silica from colloidal silica about 20% and about 50% silica from silicic acid.

117. The process according to claim 89 wherein the catalyst further comprises at least one element selected from the group consisting of manganese, zinc and any combination thereof.

118. The process according to claim 89 wherein the catalyst is characterized by an Anderson-Schulz-Flory $\alpha$ value of at least about 0.84.

119. The process according to claim 89 wherein said product mixture is characterized by an of at least 0.84.

120. The process according to claim 89 wherein the product mixture comprises $C_{5+}$ hydrocarbons and the $C_{5+}$ hydrocarbons are produced at a rate of at least 50 g $C_{5+}$/h/kg cat.

121. The process according to claim 120 wherein $C_{5+}$ hydrocarbons are produced at a rate of at least 80 g $C_{5+}$/h/kg cat.

122. The process according to claim 89 wherein methane comprises not more than about 6 wt % of said product mixture.

123. The process according to claim 89 wherein the catalyst is characterized by a $CO_2$ selectivity not greater than about 18 mol % $CO_2$.

124. The process according to claim 89 wherein the catalyst is characterized by a $CO_2$ selectivity not greater than about 13 mol % $CO_2$.

125. The process according to claim 89 wherein the catalyst is characterized by a physical catalyst attrition of less than about 8%.

126. The process according to claim 89 wherein the catalyst is characterized by a physical catalyst attrition of less than about 6%.

* * * * *

UNITED STATES PATENT AND TRADEMARK OFFICE

CERTIFICATE OF CORRECTION

PATENT NO. : 7,067,562 B2
APPLICATION NO. : 10/324419
DATED : June 27, 2006
INVENTOR(S) : Rafael L. Espinoza et al.

It is certified that error appears in the above-identified patent and that said Letters Patent is hereby corrected as shown below:

Column 17,
Line 51, "1.4:1" should read --1:1 --.

Column 18,
Line 37, "the" should read --two--.

Column 19,
Line 3, "slimy" should read --slurry--.

Column 22,
Line 21, "pails" should read --parts--.

Column 23,
Line 27, the words --and between-- were omitted before the words “about 20% and about 50% silica from silicic”.

Signed and Sealed this

Nineteenth Day of September, 2006

JON W. DUDAS
*Director of the United States Patent and Trademark Office*